(12) United States Patent
Granston et al.

(10) Patent No.: US 6,892,380 B2
(45) Date of Patent: May 10, 2005

(54) METHOD FOR SOFTWARE PIPELINING OF IRREGULAR CONDITIONAL CONTROL LOOPS

(75) Inventors: Elana D. Granston, Sugarland, TX (US); Joseph Zbiciak, North Richland Hills, TX (US); Eric J. Stotzer, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 599 days.

(21) Appl. No.: 09/733,254

(22) Filed: Dec. 8, 2000

(65) Prior Publication Data

US 2002/0120923 A1 Aug. 29, 2002

Related U.S. Application Data

(60) Provisional application No. 60/173,806, filed on Dec. 30, 1999.

(51) Int. Cl.[7] ................................................. G06F 9/45
(52) U.S. Cl. ....................................................... 717/160
(58) Field of Search ................................ 717/151–161; 712/216–228

(56) References Cited

U.S. PATENT DOCUMENTS 5,930,492 A * 7/1999 Lynch .......................... 712/216
6,240,509 B1 * 5/2001 Akkary ........................ 712/228

OTHER PUBLICATIONS

Bringmann Alex., "Enhancing Instruction Level Parallelism through compiler–controlled speculation", Univ. of Illinois, 1995.*

Schlansker et al., "Achieving High Levels of Instructions–Level Parallelism with Reduced Hardware Complexity", Nov. 1994, HPL–96–120, www.hpl.hp.com/techreports/96/HPL–96–120.pdf.*

Rau et al., "Code Generation Schema for Modulo Scheduled Loops", ACM Proceedings of the 25th annual International Symposium on Microarchitecture, Dec. 1992, vol. 23, iss. 1–2.*

Rau et al., "Register Allocation for Software Pipelined Loops", Jun. 1992, In Proc. of the ACM SIGPLAN'92 Conference on Programming Language Design and Implementation, pp. 283–299.*

* cited by examiner

Primary Examiner—Kakali Chaki
Assistant Examiner—Tuan A Vu
(74) Attorney, Agent, or Firm—Robert D. Marshall, Jr.; W. James Brady, III; Frederick J. Telecky, Jr.

(57) ABSTRACT

A method for software pipelining of irregular conditional control loops including pre-processing the loops so they can be safely software pipelined. The pre-processing step ensures that each original instruction in the loop body can be over-executed as many times as necessary. During the pre-processing stage, each instruction in the loop body is processing in turn (N4). If the instruction can be safely speculatively executed, it is left alone (N6). If it could be safely speculatively executed except that it modifies registers that are live out of the loop, then the instruction can be pre-processed using predication or register copying (N7, N8, N9). Otherwise, predication must be applied (N10). Predication is the process of guarding an instruction. When the guard condition is true, the instruction executes as though it were unguarded. When the guard condition is false, the instruction is nullified.

4 Claims, 3 Drawing Sheets

METHOD FOR SOFTWARE PIPELINING OF IRREGULAR CONDITIONAL CONTROL LOOPS

This application claims priority under 35 USC § 119 (e)(1) of provisional application No. 60/173,806, filed Dec. 30, 1999.

FIELD OF INVENTION

This invention relates to computers and computer program compilers and more particularly to pipelining program loops having irregular loop control.

BACKGROUND OF INVENTION

The ability to software pipeline computer program loops is well-known in the art and is essential to achieving good performance on Very Long Instruction Word (VLIW) computer architectures. In VLIW architectures, a compiler packs a number of single, independent operations into the same instruction word. When fetched from cache or memory into a processor, these words are easily broken up and the operations are dispatched to independent execution units. VLIW can perhaps best be described as a software- or compiler-based supercoder technology. A program loop consists of multiple iterations of the same instructions in a software program. Without software pipelining, the first iteration of a loop is completed before the second iteration is begun, and the second iteration of the loop is completed before the third iteration is begun, etc. The following is an example of a typical FOR loop, where when the loop begins n represents the number of desired iterations:

```
loop:                    ;FOR loop
     ins1
     ins2
     ins3
     dec n               ;n = n-1
[n] br loop              ;branch to loop if n>0
```

In the absence of software pipelining and assuming dependence constraints are met, a possible "schedule" for the code on VLIW processor might, for these instructions (ins1, ins2, ins3), be as follows:

```
loop:
     ins1
     ins2    || ec n ; n=n-1
     ins3    || [n] br loop ; branch to loop if n>0
```

(Note: The || operator denotes instructions that execute in parallel.)

To be most efficient, the source code corresponding to program loops should be compiled to take advantage of the parallelism of VLIW architectures. The software pipelining optimization has been used extensively to exploit this parallel processing capability by generating code instructions for multiple operations per clock cycle.

With software pipelining, iterations of a loop in a source program are compiled in such a way that when the program is run the iterations are continuously initiated at constant intervals without having to wait for preceding iterations to complete. Thus, multiple iterations, in different stages of their computations, are in progress simultaneously across multiple parallel processors.

Software pipelining thus addresses the problem of scheduling the operations within an iteration, such that the iterations can be pipelined to yield optimal throughput. See Monica Lam, "Software Pipelining: An Effective Scheduling Technique for VLIW Machines," Proceedings of the SIGPLAN '88 Conference on Programming Language Design and Implementation (1988). Care must be taken that additional iterations are not initiated once the end-condition of the loop is met. With the FOR loop above, extra future iterations may be prevented because it is easy to anticipate when the loop will end (i.e., the loop will end when n=0, and because n is consistently decremented we can anticipate the value of n for a given iteration).

A software pipelining of the FOR loop is listed below. The set of parallel instructions immediately following the label "kernel" is executed repeatedly until the final iteration is started.

```
loop: sub n,2,n                              ;execute kernel n-2 times
      ins1                                   ;prolog stage 1
      ins2|| ins1||                          ;prolog stage 2
      ;------------------------------------
kernel ins3|| ins2|| ins1|| [n] decn|| [n] br kernel
      ;------------------------------------
      ins3|| ins2                            ;epilog stage 1
      ins3                                   ;epilog stage 2
```

In the pipeline code above, the three-cycle loop becomes one-cycle loop by paralleling consecutive iterations of the loop. The kernel of the loop acts as a pipeline, processing one "stage" of each of the iterations in parallel. The pipeline is primed through the prolog code and drained through the epilog code which surrounds the kernel. The size of the kernel may be referred to as the "iteration interval" (II). In the example above, the II is 1.

In some cases, each stage, including the kernel, consists of multiple cycles. For example, this may be due to hardware restrictions such as the need to perform three multiplication operations when there are only two multipliers available. To accomplish this, two multiplications would be performed in parallel in one cycle of the kernel, and the third multiplication would be performed during the other cycle.

The kernel size may also be increased because of loop carried data dependences in the loop being software pipelined. In general, an instruction in a future iteration cannot be issued until all results that it needs from previous iterations have been computed.

In the example above, a given iteration of the FOR loop begins in the kernel while the previous two iterations are still being executed. Since two iterations start before the kernel is reached, the kernel only needs to be executed n-2 times, so at the beginning of the loop code n is set equal to n-2. Specifically, if m represents the number of iterations started, or the trip count, ins1 begins a new iteration m while simultaneously ins2 executes in the middle of iteration m-1 and ins3 executes to finish iteration m-2. However, once the final desired iteration begins (i.e., when n=0), care must be taken so that no new iterations are initiated in the following two clock cycles while the m-1 and m iterations complete. In other words, ins1 must not execute again. As shown above, this can be accomplished by unrolling the last two iterations of the pipelined loop and emitting only the instructions necessary to complete the m-1 and m iterations already in progress.

In contrast, for arbitrary condition loops such as WHILE loops or REPEAT-UNTIL loops there is no way to anticipate that the loop has begun its last iteration until the condition changes. As a result, using the software pipelining technique as described above may result in the initiation of additional iterations after the cycle in which the loop's end-condition was met. Accordingly, there is a danger that instructions executed in any additional iterations will, for example, change values that should have been finalized within the proper number of iterations.

Traditionally, only a restricted set of regular FOR loops could be pipelined. The reason is that code must be generated (or hardware must be used) to pipe down the loop (empty out the pipeline) near the end of the loop. To do so, it must be possible for the compiler or hardware to determine how many iterations in the loop remain.

More recently, it has become known in the art how to use special-purpose hardware to support pipelining of a more general class of loops know as WHILE loops. A WHILE loop is defined to be a loop which is entered at the top and exited at the bottom or can be transformed into such. Moreover, the sequence of execution of the loop body must match the static ordering of the instructions within the body. WHILE loops cover a very general class of loops which subsume FOR loops. See Tirumalai, et al., "Parallelization of WHILE Loops on Pipelined Architectures" in The Journal of Supercomputing, Vol. 5, 119–136, Kluwer Academic Publishers (1991). For many applications, however, this hardware is expensive in terms of cost or power or simply not available.

Software pipelined loops, such as the one depicted previously generally have a minimum trip count requirement. In particular, they can only be safely executed if the trip count is greater than or equal to the number of concurrently executed iterations in the steady state. For the previous example, that number is 3. The reason is that the shortest through this loop would cause three iterations to be executed.

However it is known in the literature how to handle the case where the compiler has insufficient knowledge to guarantee this safety criteria for a software pipelined loop. This problem is handled at compile time by generating two versions of the loop and using a run-time trip count check to choose between them:

```
        if (n >= min required trip count)
            pipelined version
    else
            original version
    endif
```

This technique is referred to as multiversion code generation. Unfortunately, it has the negative side effects of increasing code size and adds run time overhead. See Monica Lam, "Software Pipelining: An Effective Scheduling Technique for VLIW Machines," Proceedings of the SIGPLAN '88 Conference on Programming Language Design and Implementation (1988).

SUMMARY OF INVENTION

In accordance with an embodiment of the present invention, there is provided a software method for pre-processing WHILE loops to transform them into pipelinable lops. This method would be applied at compile-time to WHILE loops which could otherwise not be pipelined. The pre-processing step transforms each original loop instruction into one which can be safely speculatively executed (over-executed) so that there is no need to pipe down the loop. Each original instruction is examined in turn to see if it can be safely speculatively executed. If not, either predication or register copying is used to transform the instruction into one which can be speculatively executed. The predication method can be applied to all predictable instructions. The register copying method is not always applicable. However, it is often preferred when it is applicable because it can often lead to code which can be more efficiently pipelined in the absence of special hardware support.

Predication is the process of applying a guard to the instruction so that it is conditionally nullified. Register copying, in accordance with the invention, is a novel process of inserting code into the loop, when necessary, to save the state of live-out registers (i.e., registers which may be read after the loop before being written) which are modified by non-speculated instances of instructions. Temporary registers can be used for this purpose. Code is also inserted after the loop to restore the original registers with the saved values.

Software pipelining can then be applied to the loop, but the pipe down stage (epilog) is omitted. When the termination condition is reached, execution can simply stop. Omitting the epilog reduces code size over traditional pipelining techniques. Another advantage of this technique is that minimum trip count requirement is always reduced to one. Multiversion code generation is never needed.

In an embodiment, the same technique is also applied to (some) FOR loops which could be pipelined using traditional software pipelining techniques. The advantage of applying the processing step is that, in some cases, the resulting code is smaller. Moreover, in all cases, the minimum trip count requirement is again reduced to one, thereby eliminating the need for multiversion code generation which may decrease codesize and run time.

DESCRIPTION OF PREFERRED EMBODIMENT OF THE PRESENT INVENTION

Embodiments of the present invention and their technical advantages may be better understood by referring to FIGS. 1–6.

Figure 1:
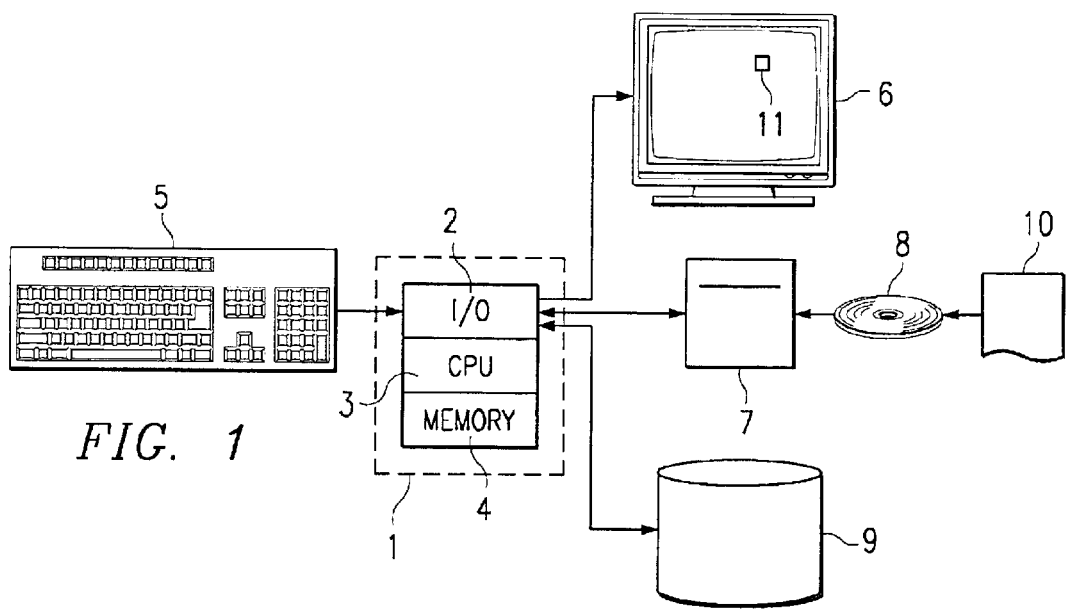
FIG. 1 illustrates a portion of a computer including a CPU and conventional memory in which the presentation may be embodied.

The environment in which the present invention is used encompasses the general distributed computing system wherein general purpose computers, workstations or personal computers are connected via communication links of various types, in a client-server arrangement, wherein programs and data, many in the form of objects, are made available by various members of the system for execution and access by other members of the system. Some of the elements of a general workstation computer are shown in FIG. 1, wherein processor 1 is shown, having an input/output ("I/O") section 2, a central processing unit ("CPU") 3 and a memory section 4. The I/O section 2 may be connected to a keyboard 5, a display 6, a disk storage unit 9 and a CD-ROM driver unit 7. The CD-ROM unit 7 can read a CD-ROM medium 8, which typically contains programs and data 10.

Figure 2:
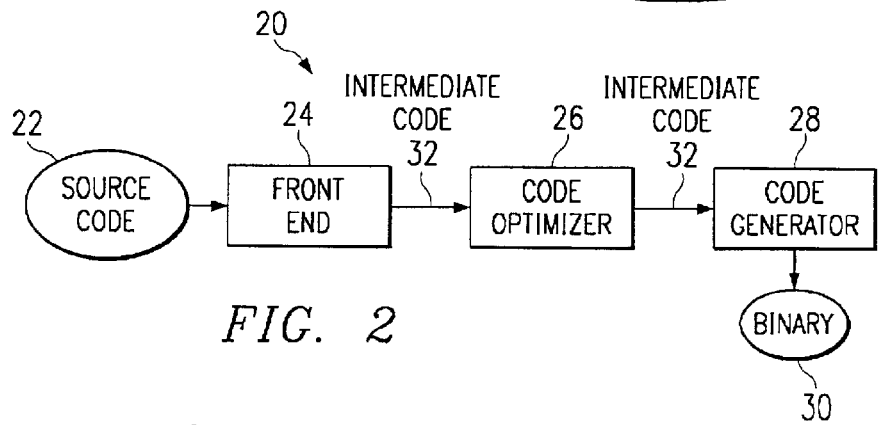
FIG. 2 illustrates a compiler showing the code optimizer.

FIG. 2 illustrates a typical optimizing compiler 20, comprising a front end 24, a code optimizer 26, and a back end code generator 28. The front end compiler 24 takes as input program 22, written in a source language, and performs various lexical, syntactical and semantic analysis on this language, outputting an intermediate set of code 32, representing the target program. Intermediate code 32 is used as input to the code optimizer 26, which attempts to improve the intermediate code so that faster-running machine (binary) code 30 results. Some code optimizers 26 are trivial, and others do a variety of optimizations (code transformations) to produce the most efficient target program possible. Those of the latter type are called "optimizing compilers," and include such code transformations as common sub-expression elimination, dead-code elimination, renaming of temporary variables, statement reordering, and loop transformations, as well as register allocation.

Figure 3:
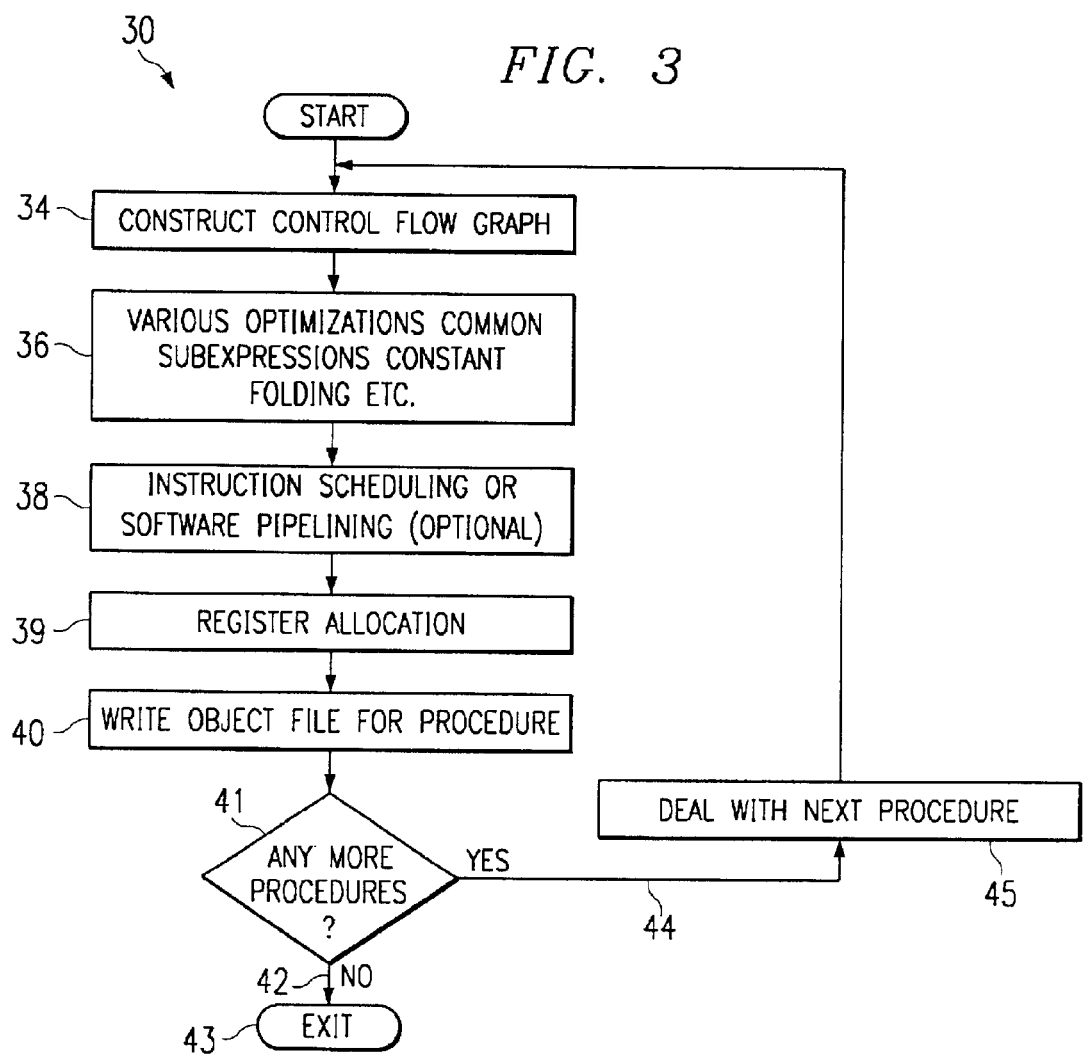
FIG. 3 illustrates organization of a code optimizer.

FIG. 3 illustrates a typical organization of an optimizing computer 30. A control flow graph 34 is constructed upon receiving the intermediate code 32. The previously mentioned code transformations 36 are performed. The instruction scheduling or software pipelining 38 is performed. The register allocation 39 is performed and the modified code is written out 40 for the compiler back end to convert to the binary language. If more procedures are required, the steps 34–40 repeat.

Modulo scheduling has its origins in the development of pipelined hardware functional units. As discussed above, the rate at which new loop iterations are started is called the Initiation Interval or Iteration Interval (II). The Minimum Iteration Interval (MII) is the lower bound on the II determined by the resource and data dependency constraints. The resource bound (ResMII) is determined by the total resource requirements of the operations in the loop. The recurrence count (RecMII) is determined by loop carried data dependencies. The MII is thus determined as MAX(ResMII, RecMII).

In modulo scheduling, the schedule for a single loop iteration is divided into a sequence of stages with a length of II cycles. In the steady state of the execution of the software pipeline, each of the stages will be executing in parallel. The instruction schedule for a software pipelined loop has three components: a prolog, a kernel, and an epilog. The kernel is the instruction schedule that will execute the steady state. In the kernel, an instruction scheduled at cycle k will execute in parallel with all instructions scheduled at cycle k Modulo II. The prologs and epilogs are the instruction schedules that respectively set up and drain the execution of the loop kernel.

Figure 4:
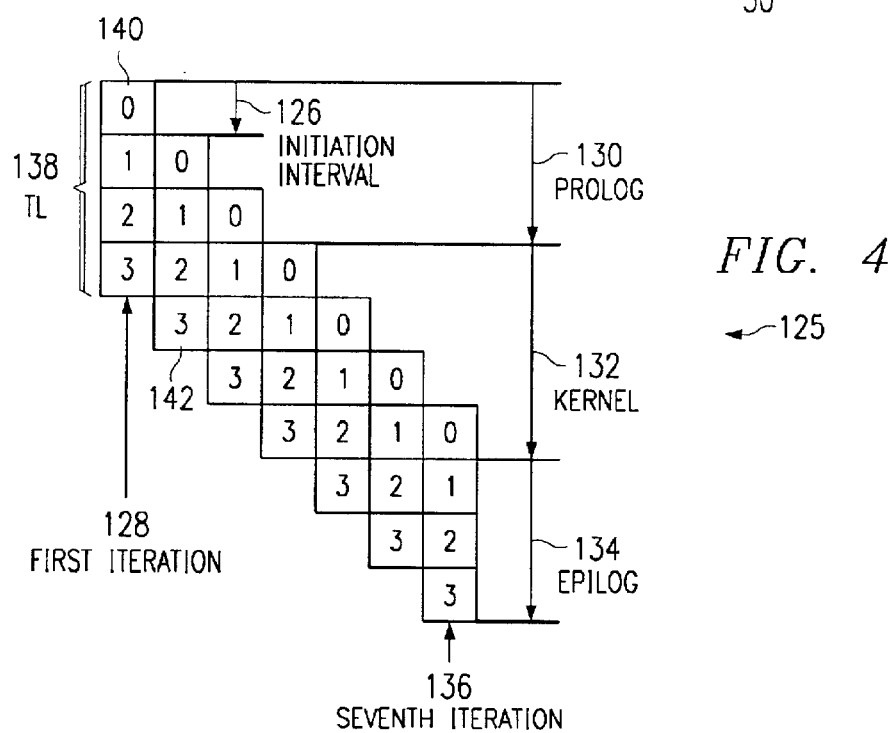
FIG. 4 illustrates a four stage seven iteration pipeline.

The key principles of modulo scheduling are as follows. Parallel instruction processing is obtained by starting an iteration before the previous iteration has completed. The basic idea is to initiate new iterations after fixed time intervals (II). FIG. 4 shows the execution of seven iterations of a pipelined loop. The scheduled length (TL) of a single iteration is TL 138, and it is divided into stages each of length II 126. The stage count (SC) is defined as, SC=[TL/II], or, in this case, TL=4 (138 in FIG. 4) and II=1 126, and so SC=[4/1]=4. Loop execution begins with stage 0 140 of the first iteration 128. During the first II cycles, no other iteration executes concurrently. After the first II cycles, the first iteration 128 enters stage 1, and the second iteration 142 enters stage 0.

New iterations begin every II cycles until a state is reached when all stages of different iterations are executing. Toward the end of loop execution, no new iterations are initiated, and those that are in various stages of progress gradually complete.

These three phases of loop execution are termed prolog 130, kernel 132 and epilog 134. During prolog 130 and epilog 134, not all stages of successive iterations execute. This happens only during kernel phase 132. Prolog 130 and epilog 134 last for (SC−1)×II cycles. If the trip count of the loop is large (that is, if the loop is of the type where 10 iterations of the loop are required), kernel phase 132 will last much longer than prolog 130 or epilog 134. The primary performance metric for a modulo scheduled loop is the II, 126. II is a measure of the steady state throughput for loop iterations. Smaller II values imply higher throughput. Therefore, the scheduler attempts to derive a schedule that minimizes the II. The time to execute n iterations is T(n)=(n+SC−1)×II. The throughput approaches II as n approaches infinity.

The code in the prolog and epilog is identical to portions of the code in the kernel, with some stages of the pipeline missing. During each prolog stage, a new iteration begins, but no iterations finish. During each execution of the kernel body, one iteration completes and a new one is started. During each epilog stage, an iteration completes, but no new iteration is started. By the end of the epilog, the last iteration is complete.

The present invention is a method for pre-processing WHILE loops so that they can be safely software pipelined. The pre-processing step ensures that each original instruction in the loop body can be safely over-executed as many times as necessary.

During the pre-processing stage, each instruction in the loop body is processed in turn. If the instruction can be safely speculatively executed (i.e., the instruction can be executed before it is known if it would have been executed in the original instruction stream), then it is left alone. If it could be safely speculatively executed, except that it modifies registers that are live out of the loop, (i.e., registers whose values will be read after the end of the WHILE loop before being written), then the instruction can be pre-processed using predication or register copying, otherwise predication must be applied.

Predication is the process of guarding an instruction. When the guard condition is true, the instruction executes as though it were unguarded. When the guard is false, the instruction is nullified (i.e., has the same effect as a NOP or no operation).

Register copying is a new technique for conditionally saving register results in accordance with the invention. The results are copied to temporary register(s) after it has been determined that the instruction would have been executed in the original stream. After loop execution, the original register(s) are restored with the last value(s) written to the temporary register.

In general, register copying is preferred over predication on architectures without special hardware support because the resulting WHILE loop can be pipelined more efficiently. Because there are typically very few live out registers in loops, register copying can generally be profitably applied, even on architectures with small register sets.

After pre-processing a WHILE loop, the loop can be software pipelined similar to a traditional loop except that no pipe-down stage is needed, so there is no epilog. A beneficial side effect is that the minimum trip count required to safely execute the loop is always 1. There is no need for multi-version loops (i.e., a pipelined and unpipelined version with a guard which selects between them).

The following is an example of a typical WHILE loop:

| loop: | | ;WHILE loop for STRCPY |
|---|---|---|
| | ld *a++, x | ;x = *a, a = a+1 |
| | st x, *b++ | ;*b = x, b = b+1 |
| [x] | br loop | |

In the WHILE loop above, assume a is not used after the end of the loop and the user allows the compiler to fetch beyond the end of the array. Thus, the instruction "ld *a++, x" may be speculatively executed, but the instruction "st x, *b++" must be predicated because the stored instruction modifies memory.

The following represents the original WHILE code loop after preprocessing using one aspect of the present invention:

| | mv 1, y | ;set y = TRUE |
|---|---|---|
| loop: | | ;WHILE loop for STRCPY |
| | ld *a++, x | ;can be speculatively executed |
| [y] | st x, *b++ | ;must be predicated |
| [!x] | mv 0, y | ;if x = FALSE then make y = FALSE |
| [y] | br loop | ; branch to loop iff y>0 |

After pre-processing, the WHILE loop can be pipelined as shown below:

| loop: | | | | ;WHILE loop for STRCPY |
|---|---|---|---|---|
| | mv 1, y | | | |
| | id *a++, x | | | |
| | [y] st x, *b++ | id *a++, x | [!x] mv 0, y | |
| kernel: | | | | |
| | [y] br kernel | [y] st x, *b++ | ld *a++, x | [!x] mv 0, y |

For the instructions in the grid, each column of the grid represents a loop iteration. Each row represents a clock cycle. Instructions in the same row are executed during the same clock cycle, and each instruction is executed by one of multiple functional units.

The input to the pre-processing algorithm is an unscheduled WHILE loop. A new predicate y is needed for this algorithm.

In step N1, an instruction is added immediately before the branch to reset y when the original branch guard x becomes FALSE, then proceeds to step N2 where the guard on the branch is modified from [x] to [y] where x is the original guard. The method then proceeds to step N3 where y is initialized to TRUE. Note that the effect of these three steps is to ensure that once the branch guard becomes FALSE, it can never become true again. Thus, the branch can be safely over-executed as many times as necessary.

The method now proceeds to step N4 where the remaining instructions in the original loop body are processed in any order. The method then proceeds to step N5. If all the remaining original loop instructions have been processed, the pre-processing algorithm is complete and pipelining can proceed. If not, the method proceeds to step N6.

In step N6, the method determines whether the current instruction can be safely over-executed without special pre-processing. If so, the method is done with this instruction and returns to step N4 to find an unexamined instruction, if any. However, if the current instruction does require pre-processing, the method proceeds to step N7.

In step N7, the method determines whether the current instruction must be predicated or whether register copying is also an option. To do so, the method determines whether the instruction could be safely over-executed, if potential problems resulting from the modification of live-out registers were ignored. If not, the instruction must be predicated and the method proceeds to step N10. If yes, the method proceeds to step N8.

In step N8, the method determines whether to use predication or register copying for this instruction. The best choice depends on both particular while loop and the features of the target architecture. The method then proceeds to step N9.

In step N9, the method chooses predication or register copying. If predication is selected, the method proceeds to step N10. If register copying is chosen, the system proceeds to N11.

In step N10, the method predicates the current instruction. If the current instruction is unguarded, the method adds the predicate [y]. If the current instruction is already guarded, a new guard must be formed which is the logical and of original guard and y. On some architectures, this may require that additional instructions be inserted into the WHILE loop. After predication, the method is finished processing this instruction and returns to step N4.

In step N11, register copying is applied. Register copying is described by FIG. 6. After applying register copying, the method returns to step N4.

Figure 6:
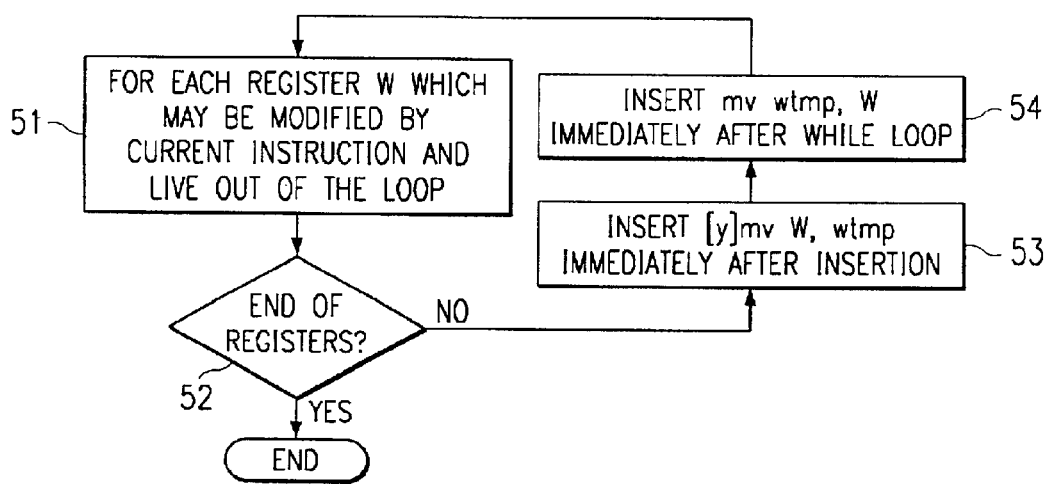
FIG. 6 illustrates a register copying in an embodiment of the present invention.
Figure 5:
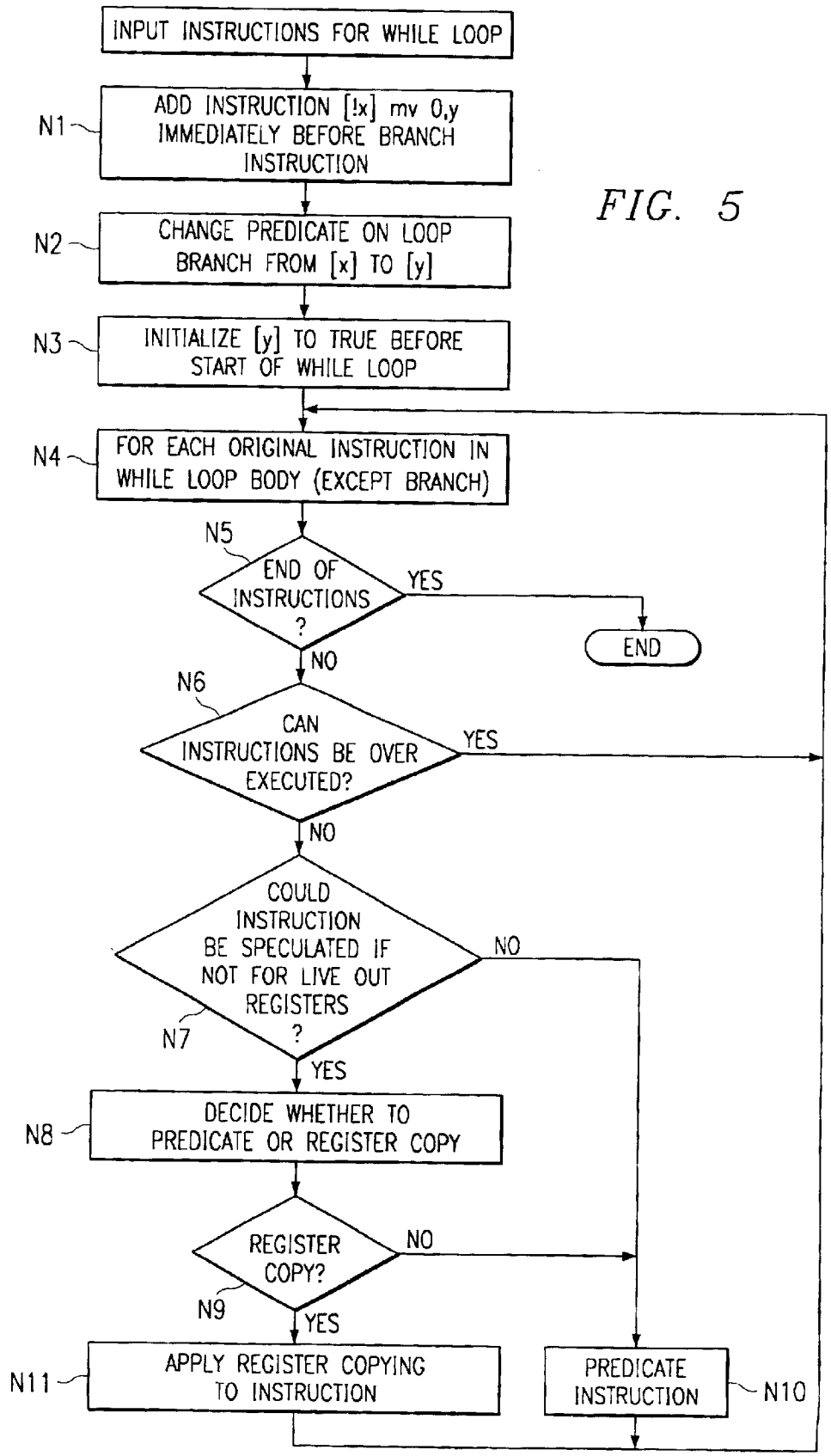
FIG. 5 illustrates a method according to an embodiment of the present invention.

Register copying is depicted in FIG. 6. In step 51, the system determines the set of all registers w may be modified by the current instruction and live out of the WHILE loop. Then, the method proceeds to step 52.

In step 53, the method determines if all registers w have been processed. If so, the method terminates. If not, the method proceeds to step 53.

In step 53, the method inserts a copy of w to a new register wtmp. This copy is inserted immediately after the current instruction. The copy instruction is guarded by [y]. Note that y is TRUE if and only if the instance of the current instruction being executed is not speculative (i.e., would have been executed in the original instruction stream). However, y need not be known when executing the current instruction. Potentially, evaluation of y can be delayed until near the end of the current iteration, thereby providing additional scheduling flexibility over prediction on some architectures. The method then proceeds to 54.

In step 54, the method restores w to the value it would have had at the end of the original loop, by copying wtmp to w after the WHILE loop terminates. Then, the method returns to step N4.

Thus, it is apparent that there has been provided, in accordance with the present invention, a method for the pipelining of irregular program control loops that satisfies the advantages set forth above. Although the preferred embodiment has been described in detail, it should be understood that various changes, substitutions, and alterations can be made herein. Other examples are readily ascertainable by one skilled in the art and could be made without departing from the spirit and the scope of the present invention as defined by the following claims.

What is claimed is:

1. A method of pipelining program loops having irregular loop control comprises the steps of:
   determining which instructions in loop code in a memory may be speculatively executed, if it is determined that the instruction would be able to be speculatively executed except that it modifies a register that is alive out of the loop performing the steps of:
   storing in a computer memory a set of registers that are modified by said instruction and are alive out of the loop, and
   modifying the program code so that the values of those registers are saved to a temporary register during all proper iterations, and
   copying back to said registers the values of the temporary register once the loop is completed.

2. The method of claim 1, applied to any program loops wherein a minimum trip count is reduced to one.

3. The method of claim 1, applied to any program loops wherein a need for a multiversion code is eliminated.

4. A method for software pipelining of irregular conditional control loops includes pre-processing the loops so they can be safely software pipelined, comprising the steps of:
   pre-processing each instruction in the loop in turn;
   if the instruction can be safely speculatively executed, leaving the instruction alone;
   if it could be safely speculatively executed except that it modifies registers that are live out of the loop, pre-processing the instruction using register copying and otherwise using predication.

* * * * *